United States Patent [19]

Gaillard

[11] 4,140,824

[45] Feb. 20, 1979

[54] PREFABRICATED WALL PANEL

[75] Inventor: Adrianus J. C. Gaillard, Zwijndrecht, Netherlands

[73] Assignee: Hunter Douglas International N.V., Willemstad, Netherlands Antilles

[21] Appl. No.: 742,610

[22] Filed: Nov. 17, 1976

[30] Foreign Application Priority Data

Nov. 19, 1975 [DE] Fed. Rep. of Germany ....... 2551905

[51] Int. Cl.² ............................................. B32B 3/02
[52] U.S. Cl. .................................... 428/81; 52/309.7; 52/309.9; 52/309.11; 428/177; 428/188; 428/310
[58] Field of Search ............... 52/309.7, 309.9, 309.11, 52/402, 403, 586, 595; 428/45, 52-54, 68, 69, 71, 72, 74-76, 81, 83, 177, 188, 192, 310, 315

[56] References Cited

U.S. PATENT DOCUMENTS 3,262,136 7/1966 Sevcik ..................................... 428/81

FOREIGN PATENT DOCUMENTS 825661 10/1969 Canada ..................................... 428/315

Primary Examiner—William J. Van Balen

[57] ABSTRACT

The invention discloses a prefabricated partition having high acoustical insulation value and comprising two parts which are symmetrical on either side of a plane parallel to and between the outer facings. The frame members of one part being adhered to the frame members of the opposite part by an adhesive over at least a portion of the adjoining frame surfaces. To reduce the area of contact between the rigid frames they may be recessed along a portion of their adjoining surfaces and the recesses filled with an elastic foam. The frames are preferably of a rigid foam material.

12 Claims, 3 Drawing Figures

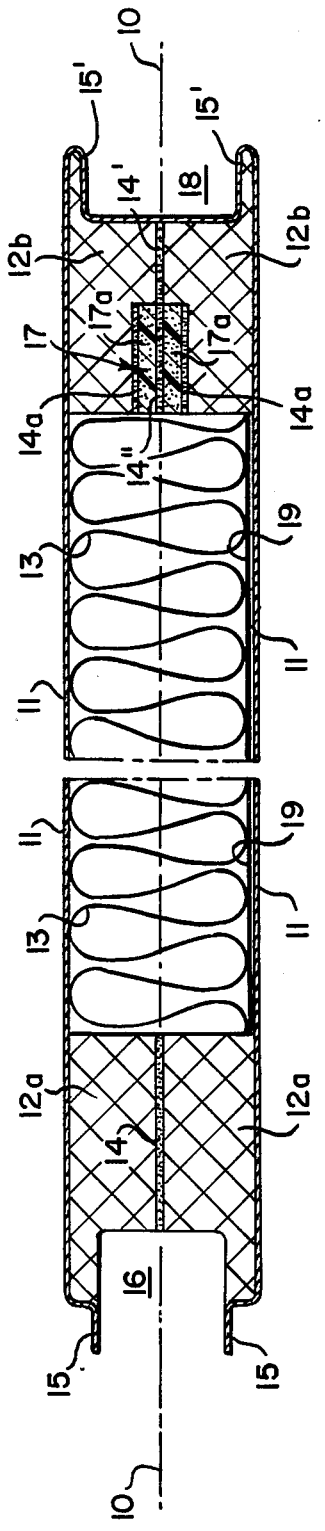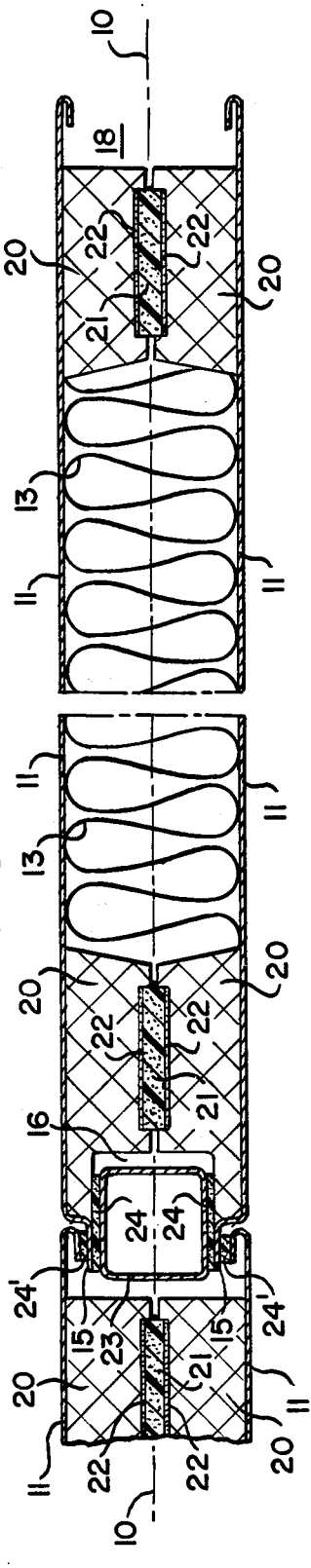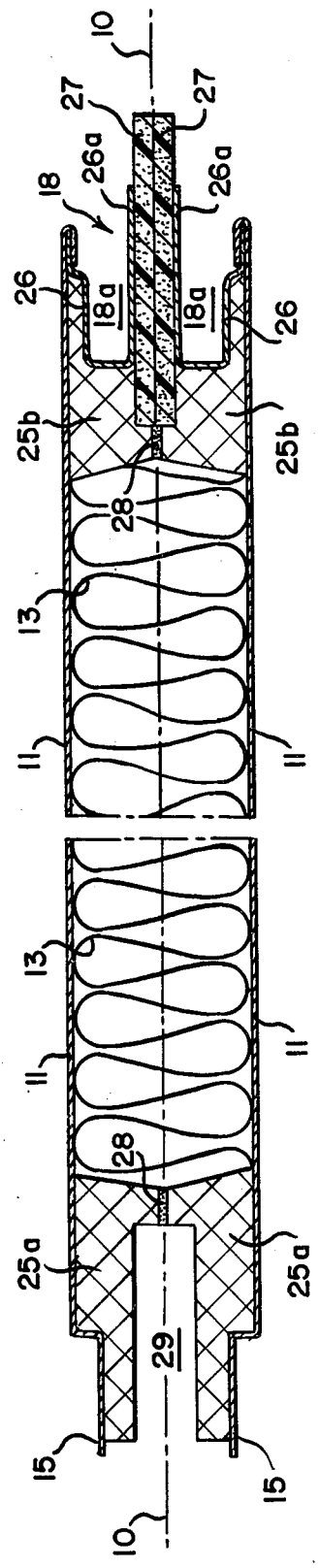

PREFABRICATED WALL PANEL

BRIEF DESCRIPTION OF PRIOR ART AND OBJECTS

The invention relates to a sandwich-type prefabricated wall panel having two outer facings and frame members arranged between them thus determining the distance between the facings.

Regarding such panels, in particular those employed for partition systems, one important consideration is the achievement of effective soundproofing.

Heretofore, high degrees of acoustic insulation have been achieved ony with wall panel systems to be field-assembled from separate boards and fillers. By comparison, prefabricated wall panels ready assembled and requiring only field installation have had substantially poorer soundproofing properties.

In this state of the art, the object of the invention is to improve a completely prefabricated wall panel, requiring only field installation, in such a way as to achieve substantially better soundproofing. Furthermore, another object is to provide such a wall panel that is simple and inexpensive to fabricate. Accordingly, a further object of the invention is to provide a process satisfying this requirement.

BRIEF DESCRIPTION OF THE INVENTION

These objects are accomplished by virtue of the following: The wall panel is composed of at least two joined parts, each preferably comprising a wall portion and a frame portion. The region in which the two parts of the panel are connected to each other is to be elastically constructed insofar as possible. The purpose of this arrangement is that each part of a panel shall have an independent soundproofing effect of its own. This requires utmost vibrational independence of the panel parts from each other, even though there is a structural connection between them, and the elasticity must be kept within limits in order to provide the requisite strength.

The frame portions of the panel according to the invention are designed to provide as much elasticity as possible consistent with adequate strength. If the partition system is to be installed with use of additional studs, this principle of design may result in adoption of a panel strength gauged largely by the stresses incurred in transport, with suitable allowance being made for the strength to be subsequently contributed by the studs. The areas of the bonding surfaces are determined on the basis of the same considerations.

When studs are thus used, it is of course important also to see that elastic interlays are provided between the studs and adjacent portions of the panels, to avoid direct conduction of sound.

This result is achieved, according to the invention, by structurally dividing the panel at a parting surface located between the facings, into two parts each having an outer facing and a frame portion, in which the outer facing is made of sheet material, preferably metal, and the frame portions of foam material forming and bounding at least one hollow interior portion, and in which the parts of the panel are bonded together at their frame portions of foam material.

The discovery of the invention is that by such a construction of the wall panel, very good acoustic insulation is obtained. Depending on the particular embodiment of the invention, an acoustic damping of at least 35 to 45 dB can be achieved. The frame portions forming the frame elements must be dimensioned according to the requirements of geometrical stability in each particular case. The same of course applies also to the material of the outer facing, which may preferably be steel inasmuch as the high specific weight of steel, which is favorable to soundproofing, permits a small shell thickness. Alternately, however, some other metal or a synthetic material may be employed.

Fabrication and installation are simple and economical, particularly as the two parts comprising the wall panel may be exactly alike.

The structural connection between the two panel parts, then, is effected entirely by bonding, at least between the frame portions of foam material. Therefore, good soundproofing results are attributable in part to the fact that, owing to the proposed arrangement between the two outer faces, even should they be of metal, no acoustic bridge of metallic material is present cr required, and that a firm connection is obtained by bonding comparatively small surface areas only.

Some advantageous embodiments of the invention will now be described, in one of which the frame portions are arranged as far as possible towards the two lateral edges of the outer facing and parallel to them and are each in the form of a continuous member. The mean available soundproofing effect is thereby enhanced.

The two panel parts are preferably quite or nearly symmetrical in structure with respect to the parting surface, or mirror images of each other. Alternatively, however, they may be of unlike shape, usually in that the facings are differentiated, for example by profiling.

Further, the interior bounded by the outer facings and frame portions may be filled with sound-insulating fillers, for example glass wool, resulting in especially good sound insulation.

In a refinement of the invention, it is proposed further that between the foam frame portions, over at least part of their breadth, thin strips be arranged of a material having greater elasticity than the foam material, and that the frame portions be joined to each other by bonding of these strips only. While this may further improve the acoustic insulation, it is conceivable that at least in some cases, the use of studs will become necessary upon assembly.

In modification of this idea, however, it is conceivable also that the frame portions of two abutting panel parts may be directly bonded together over the outer portion of their breadth only, and that the remaining portion of the breadth of each may be occupied by a strip of elastic material, for example soft foam, bonded into a matching recess of the associated frame portion, and likewise bonded to the strip on the other frame portion. The geometrical stability of the panel is hardly impaired at all thereby, while the interlayer of soft foam further improves the acoustic insulation.

Hard foam material is highly suitable for the frame portions. It has been found that with use of hard foam and suitable dimensioning of cross sections of the frame portions the panel will be sufficiently rigid even if an additional adhesive which becomes inelastic when set is used, that additional studs will not be required when the wall panels are assembled in a partition.

The frame portions may be prefabricated foam members connected to the outer facing by bonding. Alternatively, however, the frame portions may be foamed directly onto a suitably prepared inner surface of the facing.

In further refinement of the invention it is proposed that, in order to obtain different resonance frequencies, the facings may be of different thickness or that, in order to increase the mass, at least one facing may be provided on the inside with a lining of high specific weight. Also, to adjust their mass to a suitable value for soundproofing the frame portions may be provided with recesses, holes, grooves or the like. Such measures permit optimum adaptation and correspondingly different acoustic frequencies. A suitable liner is for example barium sulfate or lead sheet.

The frame portions and outer facings of the two parts of a panel may be formed on their two opposed lengthwise edges so that there will be two flanges in the planes of the facings on one lengthwise edge, with a mortise between them, and a tenon matching the width of the mortise on the other edge. The panels may then meet in a tongue-and-groove joint. If the insides of the flanges forming the sides of the groove are of the foam material of the frame portions, any contact between the facings of adjacent panels can be avoided.

It is favorable also, in such an embodiment of the invention, for the tongue to be recessed in lengthwise direction of the panel. The space between the tongue elements formed by the recess can then serve to accommodate a stud or for passage of piping and wiring.

Next, some further features of the invention will be described that will impart fireproof properties to the proposed wall panel. For this purpose, it is proposed that two more or less U- or Z-shaped intermediate members, preferably metallic, be inserted in the groove and that a strip of fireproof material be arranged between facing flanges of said members, so dimensioned that its free portion can enter into a suitably filled recess in a neighboring wall part. In this embodiment also, direct contact between metallic parts is avoided. On the opposed side of the panel, the foam frame portions associated with the tongue are suitably recessed.

In elaboration of this embodiment of the invention, conceivably the strip of fireproof material may reach in so far between the frame portions beyond the base of the groove that said portions are directly bonded together on a remaining narrow surface only. In addition, the strip of fireproof material may be divided, in the parting surface of the two panel parts, into two like strip portions, which if necessary may be connected by bonding, riveting or the like.

Again, conceivably the insides of the frame portions, as viewed from the facing towards the parting plane, may be inclined outward, so that any filler present will not get between the frame portions when assembled.

Simple and economical fabrication of such a wall panel may be achieved, according to a further proposal of the invention, in a process characterized by the following steps:
 (a) Two ready shaped facings are fed at a time;
 (b) The frame portions are applied to the insides of the shaped facings;
 (c) Adhesive is applied to the frame portions of at least one of the panel parts;
 (d) The two panel parts are brought and pressed together.

Thus the two parts of each panel may be finished within like intervals of time - not necessarily meaning simultaneously. This is favored by the essentially like construction of the two panel parts. The production time required for a panel is comparatively short.

Within this process, the frame portions can be foamed directly onto the insides of the facings, or else bonded to the insides of the facings, in the form of prefabricated frame portions. In the former case, the shaped facings may expediently be preheated to a suitable foaming temperature.

If necessary, the facings with frame portions in place may be subjected to a drying or setting operation, as the case may be, before the adhesive is applied. If a filler of soundproofing material is to be placed between the facings of a panel, this may be done before bringing the panel parts together.

BRIEF DESCRIPTION OF THE DRAWINGS

Some embodiments of the invention will now be described by way of example with reference to a drawing. Specifically, FIG. 1 shows a horizontal section of a wall panel, exhibiting two alternative embodiments, one at each end;

FIG. 2 shows a horizontal section of a second embodiment of the wall panel;

FIG. 3 shows a horizontal section of a fireproof wall panel.

DETAILED DESCRIPTION OF THE INVENTION

In the embodiment illustrated in FIG. 1, the panel consists of two parts symmetrical with respect to a parting plane 10, each comprising an outer facing 11 of steel and frame portions 12a and 12b of a hard foam material, for example polyurethane or a phenolic foam. The space between frame portions 12a and 12b and facings 11 is filled with a filler 13, in this case glass wool, providing good acoustic insulation.

In the alternative represented at the left in FIG. 1, the two frame portions 12a of hard foam material are joined over the entire breadth of their abutting areas by a bonding layer 14 of adhesive, inelastic when set. As a rule, a suitable two-component adhesive will be used for this purpose. The two facings 11 are so shaped at their edges that they each form a tongue 15 narrower than the actual panel thickness. The space between them is recessed clear back into the frame portions 12a, leaving a combined recess 16 to accommodate piping or wiring for example.

In the alternative embodiment of a panel as represented on the right in FIG. 1, the frame portions 12b have a layer of adhesive 14' directly connecting them over only part of their width, whereas internally a strip 17 of soft foam is bonded into matching groovelike recesses of frame portions 12b. The material for the strips 17 may be for example, PVC, polyethylene or a polyurethane foam of suitable softness.

The strip 17, too, may be divided at the parting plane 10 into two portions 17a, each first connected to the associated frame portion 12b by a layer of adhesive 14a. When the two panel parts are filled together to make the finished panel, the two strip portions 17a will likewise be bonded together by the layer of adhesive 14" of matching width.

The portions 12b with their associated facings 11 make flanges 15' forming a groove 18. The width of the groove 18 (i.e., the distance between the facing surfaces of the flanges 15') is of a dimension to easily receive therein the spaced flanges 15. Thus the panels may be connected at each joint by slipping tongues 15 into a groove 18. Alternatively, the recess may be left completely clear.

The inside of one facing 11 here has a lining 19 of barium sulfate, merely indicated in the drawing by a heavier line. The lining 19 increases the mass of this facing 11.

In the embodiment represented in FIG. 2, the panel is again composed of two parts symmetrical with respect to the parting plane 10, each having an outer wall 11 of steel and frame portions 20 of hard foam. The facings 11, as in the embodiment previously described by way of example, each form a tongue 15 at the left as well as a recess 16, while at the right, as in the embodiment previously described by way of example, they project somewhat in the plane of the facing, forming a groove 18.

Here, however, the frame portions 20 of hard foam do not abut directly, but are joined by a strip 21 of soft foam, and on both faces thereof by adhesive layers 22. Since this embodiment is not quite as rigid, several panels are assembled into a partition with the aid of a stud 23 inserted in the recess 16. Between it and the interior of recess 16, there is another strip 24 of soft foam, preventing any continuous acoustic bridge between metal parts.

This panel also is filled internally with filler 13. In departure from the embodiment previously described, however, the insides of frame portions 20, facing the filler 13, are beveled outward from the parting plane 10. This has the advantage that during assembly with one-half of the partition lying on its face and the filler 13 is placed therein, and the other half is then placed on top, the filler 13 will be pushed somewhat away from the joint between the two frame portions 20, and not get between them.

Also, unlike the embodiment previously described by way of example, the frame portions 20 bounding the groove 18 at the right in the drawing are not prolonged to form the sides of grooves 18, these sides being formed by the turned edges of the facings 11 only. Between the turned edges of the facings 11 and the outsides of the tongues 15 of an adjoining panel, another strip of foam 24' may be inserted.

In the embodiment shown by way of example in FIG. 3, the panel is again divided into two parts symmetrical with respect to the parting plane 10, and each consisting of a facing 11 and frame portions 25a and 25b. At the right in FIG. 3, more or less U-shaped intermediate members 26 are inserted in the folds formed by turning in the edges of the facings 11, while the free flanges 26a now subdivide the groove 18 into two smaller grooves 18a. Between the flanges 26a of the two intermediate members 26 is inserted a strip of fireproof material, made up of two portions 27; it extends beyond the actual bottom of the groove into the frame portions 25b, so that an adhesive layer 28 directly connecting the frame portions 25b is comparatively narrow.

At the other edge of the panel, the termination of the facings 11 forming the tongues 15 are additionally lined with a layer of hard foam integral with frame portions 25a. A recess 29, matching the width of strip portions 27, extends into frame portions 25a, again leaving only a comparatively narrow adhesive layer 28 to connect the frame portions 25a directly. Such a narrow connection is possible without impairment of geometrical stability because the latter will be reinforced by the intermediate members 26 and also if desired by the strip portions 27 of fireproof material.

The strip portions 27 may alternatively be inserted after the top and bottom (as viewed in the figures) panel parts have been superimposed, and if necessary joined firmly by bonding, riveting or the like.

In this embodiment, it may be desirable on occasion to connect the intermediate members 26 to the facings 11 first, and then foam the frame portions 25a and b directly in place.

The process proposed according to the invention, in the case of the last mentioned example, might then be that first two ready-shaped facings 11 are connected to their intermediate members 26 and, if desired, preheated to a suitable foaming temperature. Then the frame portions are foamed directly onto the insides of the facings 11. Then the parts so prepared are subjected to a drying or setting operation as required. Only then is adhesive applied to at least one of the parts. The filler 13 is placed in one of the parts, after which the two are brought and pressed together. After that, strip portions 27 may be inserted as mentioned above.

I claim:

1. A prefabricated wall panel comprising two parts, each of said parts having a facing of sheet material, each of said parts also having a frame to which said facing is secured, the frames of said parts being of a rigid foam material, the frame of one of said parts being joined to the frame of the other of said parts at a parting surface positioned between said facings of the panel, said parting surface being a plane substantially parallel to the planes of said facings, portions of the frame of each of said parts being positioned adjacent to and parallel with each of the two lateral edges of its associated facing, each of said frame portions being of lesser extent in the lateral direction of said panel than its associated facing, said facings and said frames defining an interior space between said facings.

2. The panel of claim 1 in which the interior space between said facings contains an acoustic filler material.

3. The panel of claim 1 in which the frame of one of said parts is adhered to the frame of the other of said parts over at least a portion of the width of said frames by a material having greater elasticity than the foam material, said frames being connected together only by such elastic bond.

4. The panel of claim 1 in which the frame of one of said parts is bonded directly to the frame of the other of said parts over a portion of the width of said frames only and the remainder of the width of said frames being joined by an elastic material, each of said frames having a recess therein for receipt of said elastic material.

5. The panel according to claim 4 in which at least one of said facings has a lining of high specific weight.

6. The panel of claim 4 in which said facings are of different thicknesses.

7. The panel of claim 1 in which the lateral edges of said panel have a tongue and groove arrangement for engagement by a like panel and in which the tongue and groove are dimensioned after engagement to permit the location of a stud within said groove as well as the tongue of an adjacent panel.

8. The panel of claim 1 in which the lateral edges of said panel have a tongue and groove, said groove is provided with two substantially "U" shaped intermediate members, said intermediate members being spaced apart, a strip of fireproof material arranged in the space between said intermediate members and extending outwardly beyond the lateral edge of said panel, and a recess within the tongue on the opposite side of said panel for receipt of the extending portion of fireproof material and portions of the intermediate members of a like adjacent panel.

9. The panel of claim 8 in which said fireproof material extends into the frame of said parts beyond the base of the groove whereby said frames of said two parts are bonded together along only a relatively narrow area.

10. The panel of claim 9 in which said strip of fireproof material is subdivided into two parts at the parting surface.

11. The panel according to claim 2 in which the margin of said frame that faces the space between the facings when viewed from the facing toward the parting surface are beveled outwardly.

12. The panel of claim 1 in which said two parts are mirror images of each other with respect to the parting surface.

* * * * *